US008896598B2

(12) United States Patent
Collin et al.

(10) Patent No.: US 8,896,598 B2
(45) Date of Patent: Nov. 25, 2014

(54) SYSTEM AND ASSOCIATED METHODOLOGY FOR THREE-DIMENSIONAL RENDERING OF DATA CONTAINING CLIPPING SHAPES

(75) Inventors: Gilles Collin, Guyancourt (FR); Nathalie Sarrazin, Puteaux (FR)

(73) Assignee: Dassault Systemes, Velizy Villacoublay (FR)

( * ) Notice: Subject to any disclaimer, the term of this patent is extended or adjusted under 35 U.S.C. 154(b) by 590 days.

(21) Appl. No.: 12/959,642

(22) Filed: Dec. 3, 2010

(65) Prior Publication Data

US 2012/0139916 A1   Jun. 7, 2012

(51) Int. Cl.
*G06T 17/00* (2006.01)
*G06T 15/30* (2011.01)
*G06T 15/10* (2011.01)

(52) U.S. Cl.
CPC .................................. *G06T 15/30* (2013.01)
USPC ........................... 345/420; 345/423; 345/427

(58) Field of Classification Search
CPC ....................................................... G06T 19/00
See application file for complete search history.

(56) References Cited

U.S. PATENT DOCUMENTS

| | | | | |
|---|---|---|---|---|
| 6,396,494 | B1* | 5/2002 | Pittet | 345/423 |
| 2006/0072821 | A1* | 4/2006 | Wang | 382/173 |
| 2008/0303815 | A1* | 12/2008 | Noro | 345/420 |
| 2010/0118029 | A1* | 5/2010 | Khulusi | 345/420 |

OTHER PUBLICATIONS

Yuan, Feiniu. "Real time multiple planar volume clipping based on the programmable graphics process unit." Optica Applicata 39.2 (2009): 331-345.*
Weiskopf, Daniel, Klaus Engel, and Thomas Ertl. "Volume clipping via per-fragment operations in texture-based volume visualization." Proceedings of the conference on Visualization'02. IEEE Computer Society, 2002.*
Mukherjee, Dipti Prasad. Fundamentals of computer graphics and multimedia. PHI Learning Pvt. Ltd., 2004.*
Ohura, K., et al. "Volume-CAD: An integrated environment for virtual manufacturing and structural analysis." Advanced Materials Research 23 (2007): 17-24.*

* cited by examiner

*Primary Examiner* — Kee M Tung
*Assistant Examiner* — Zhengxi Liu
(74) *Attorney, Agent, or Firm* — Oblon, Spivak, McClelland, Maier & Neustadt, L.L.P.

(57) ABSTRACT

A system and method for rendering a three-dimensional object as clipped based on one or more clipping shapes. A three-dimensional space is partitioned based on the clipping shapes to determine a clipped volume domain having an envelope of faces. The envelope is projected onto a screen plane according to a first viewpoint. The three-dimensional modeled object is rendered as a clipped three-dimensional modeled object based on a determination, according to each pixel on the screen plane with respect to the first viewpoint, of which faces of the envelope are projected onto each pixel. Rendering can then be repeated any time the viewpoint is changed without requiring further data preparation.

43 Claims, 13 Drawing Sheets

SYSTEM AND ASSOCIATED METHODOLOGY FOR THREE-DIMENSIONAL RENDERING OF DATA CONTAINING CLIPPING SHAPES

FIELD

The claimed advancements relate to a computer aided design (CAD) system and associated methodology for rendering one or more virtual representations of clipped three-dimensional modeled objects.

BACKGROUND

In industry, CAD systems are used to aid in the design of an object by allowing designers to visualize and design the object before it is physically created. In this way, a designer may determine whether the three-dimensional modeled object is suitable for its intended application, and make necessary refinements, without having to resort to the expense of configuring equipment, making dies and acquiring the raw materials necessary to actually make the object.

When visualizing and designing the object, a user is often interested in viewing both internal and external portions of the object. In order to view these different portions concurrently, the CAD system removes, or clips, the portions of the object and renders the object as it would look without the removed portions. The portions designated for removal are known as clipping shapes. The removal of these clippings shapes is accomplished by generating a series of infinite clipping planes and dividing or clipping the object based on each clipping plane. The number of infinite clipping planes required depends upon the complexity of the clipping shape. As such, the object is rendered as clipped based on one or more infinite clipping planes. The object is then rendered as clipped again based on one or more remaining infinite clipping planes. Thus, the clipping and rendering of the object are performed in a single step. Once this process has been repeated for each set of infinite clipping plane, the resulting renderings of the object are merged to display the object.

Therefore, conventional rendering methods require that a plurality of renderings be performed for each clipping shape thereby resulting in an increased processing load to generate and display the clipped three-dimensional object. Further, the use of complex clipping shapes induces additional processing delays because of the repeated separate renderings. The conventional rendering methods also restrict a user to a limited amount of predefined clipping shapes because the clipping shapes are rendered with a specific rendering combination. These predefined rendering combinations further prevent the user from mixing a plurality of clipping shapes. In addition, repeated renderings of the object based on a clipping shape can cause effects such as transparency, reflection and shadows of the three-dimensional clipped scene to be rendered incorrectly.

A need exists for a method of rendering a three-dimensional modeled object as clipped without the complexity, processing load and other limitations that arise out of the conventional rendering method.

SUMMARY

A computer aided design station, and method, for rendering a virtual representation of a clipped three-dimensional modeled object includes data preparation and data rendering. The data preparation is independent of the three-dimensional modeled object and includes generating at least one clipped volume domain having an envelope composed of faces. The data rendering includes calculating a projection of the envelope of the at least one clipped volume domain on a screen plane according to a first viewpoint and determining, according to each pixel of the screen plane with respect to the first viewpoint, a location of the faces of the projected envelope with respect to each pixel. The three-dimensional modeled object is then rendered by a processor of the computer aided design station according to the first viewpoint and based on the results of the determining step.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and their exemplary depictions do not in any way limit the scope of the advancements embraced by this specification. The scope of the advancements embraced by the specification and drawings are defined by the words of the accompanying claims.

DETAILED DESCRIPTION

Figure 1:
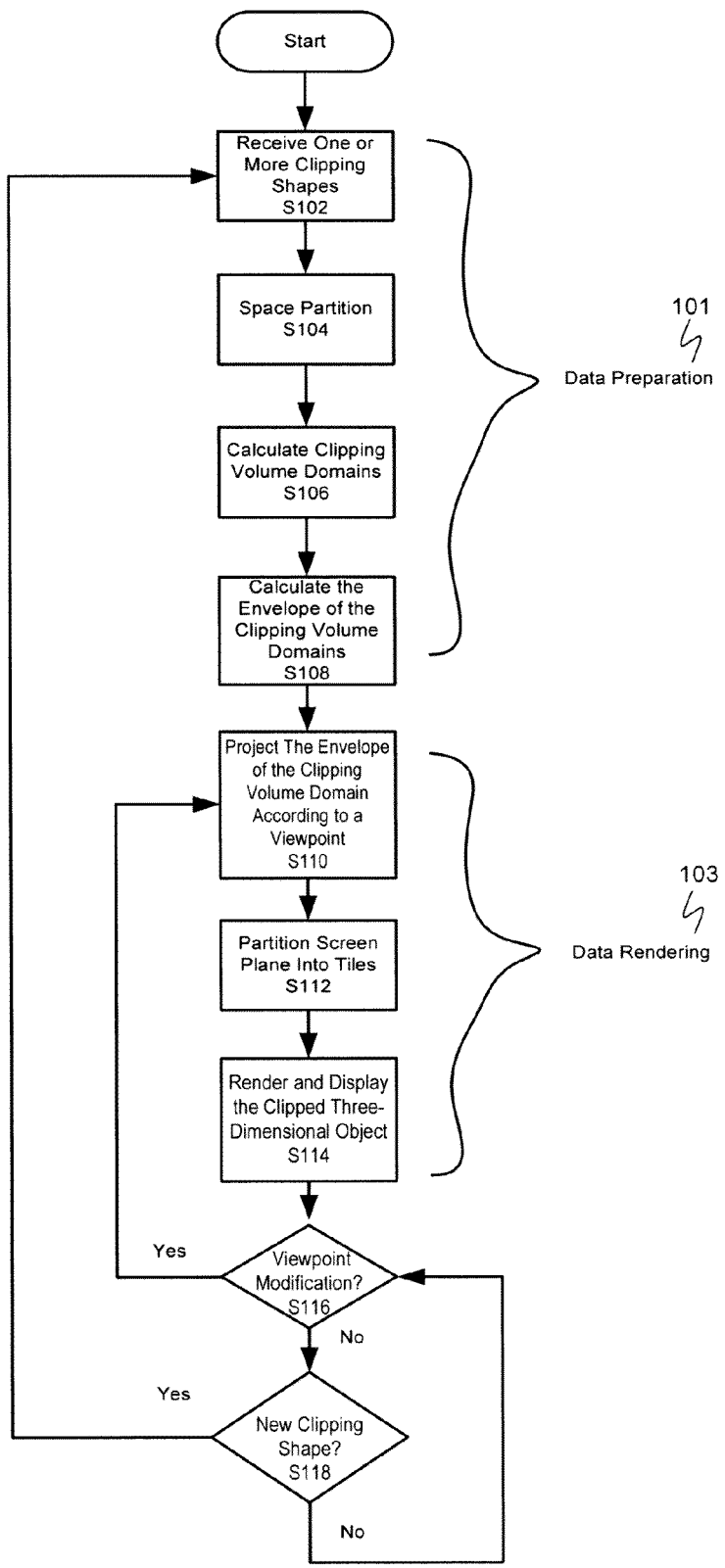
FIG. 1 is an algorithmic flowchart of clipping and rendering a three-dimensional modeled object according to an exemplary embodiment of the present advancement.

Referring now to the drawings, wherein like reference numerals designate identical or corresponding parts throughout the several views, the claimed advancements relate to a system and associated methodology for rendering a virtual representation of a clipped three-dimensional modeled object. Specifically, the CAD system receives at least one clipping shape to partition a three-dimensional modeled object. A three-dimensional space is then partitioned into a plurality of regions from which a clipped volume domain, or a domain representing the portion of the three-dimensional space that will be clipped, is determined. The clipped volume domain envelope, or the planar boundaries of the clipped volume domain, are then determined and projected onto a screen plane according to a particular viewpoint of the user. The screen plane with respect to the viewpoint is then partitioned into a series of tiles according to the clipped volume domain envelope and the object is rendered based on this partition. Thus, even complex clipping shapes are rendered in a single rendering.

When the viewpoint is changed, the clipped volume domain envelope is again projected onto the screen plane according to the new viewpoint, the screen plane is partitioned into tiles and the three-dimensional modeled object is rendered as clipped based on the new viewpoint. The partitioning of the three-dimensional space and the calculation of a clipped volume domain and clipped volume domain envelope need only be performed again when at least one new clipping shape is received by the CAD system. Further, as the data preparation is independent of the three-dimensional modeled object, only rendering needs to be repeated to display a modified clipped three-dimensional modeled object.

In one embodiment, a set of tetrahedrons formed together represents the three-dimensional space but any other set of shapes, such as cubes and rhombohedrons, could be used as would be recognized by one of ordinary skill in the art. For example, a three-dimensional space buffer, or any other type of storage for graphical information as would be recognized by one of ordinary skill in the art, stores the set of tetrahedrons to represent the three-dimensional space.

FIG. 1 is a flow chart illustrating the overall processing of rendering a three-dimensional modeled object as clipped. The flow chart is divided into two sections: data preparation 101 and data rendering 103. In data preparation 101, information is gathered independent of the three-dimensional modeled object from the three-dimensional space partition to determine how the virtual three-dimensional modeled object will be clipped by one or more clipping shapes. The data rendering 103 then determines a viewpoint of the user and displays a rendering of the three-dimensional modeled object as clipped according to the viewpoint and the information obtained during the data preparation 101.

In FIG. 1, at step S102, the one or more clipping shapes that will be used to partition the three-dimensional space into a clipped volume domain are received. The clipping shapes can be any shape and include clipping indication units representing a side of the clipping shape to be clipped away from the three-dimensional modeled object. The clipping shapes include default clipping shapes and user-defined clipping shapes that can be generated directly on the three-dimensional modeled object or in another virtual space independent of the three-dimensional modeled object. The area at which the clipping shapes are generated on the three-dimensional modeled object represents where the clipping of the three-dimensional modeled object will take place.

Figure 2:
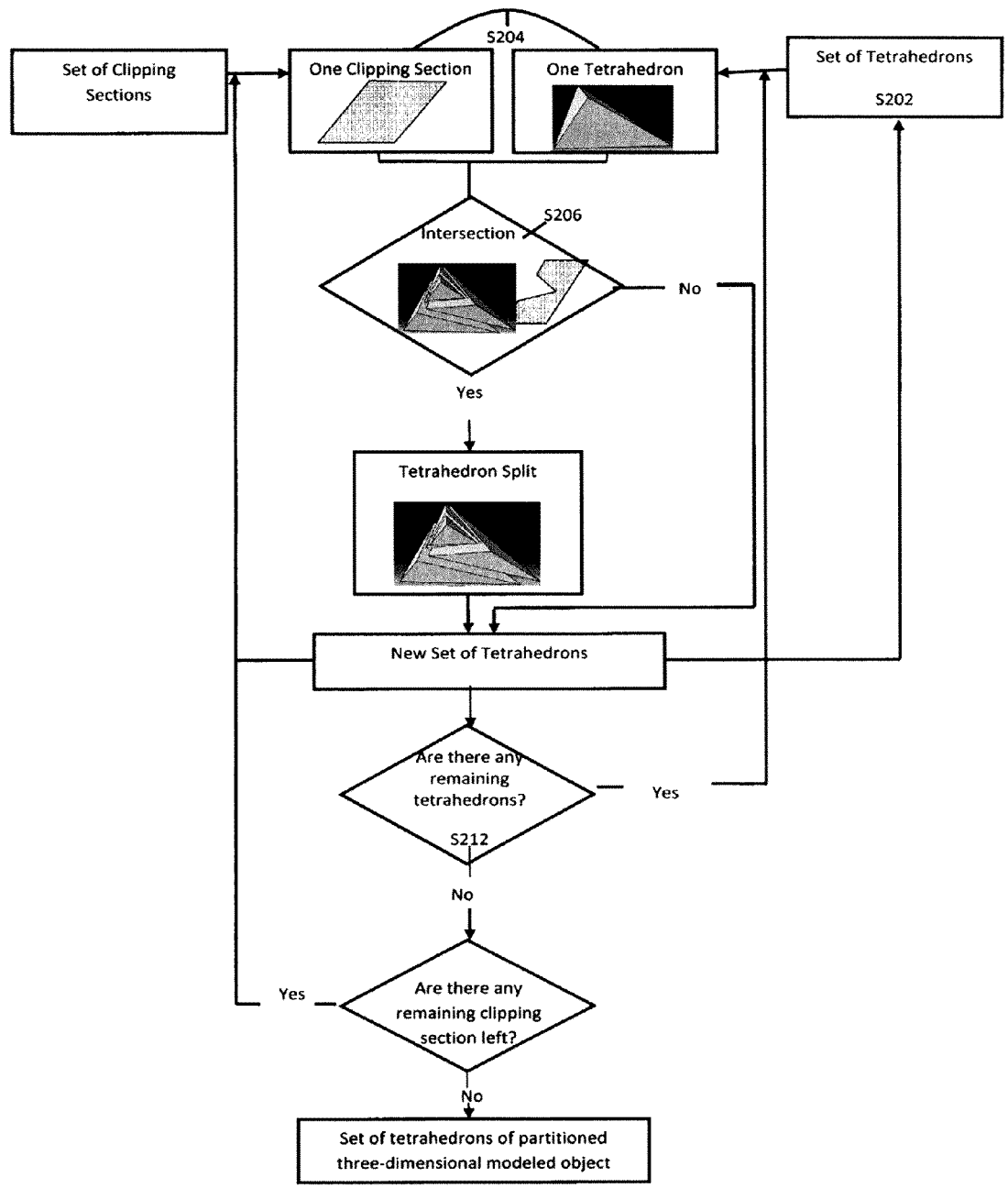
FIG. 2 is an algorithmic flowchart of partitioning a three-dimensional space according to an exemplary embodiment of the present advancement.

At step S104, a three-dimensional space is partitioned based on the clipping shapes. FIG. 2 is an algorithmic flow chart of the partitioning process of a three-dimensional modeled object according to step S104.

In FIG. 2, the partitioning starts by generating a set of clipping sections and a set of tetrahedrons at step S202. Clipping sections represent the set of finite, semi-finite or infinite planes that are associated with the one or more clipping shapes. The set of tetrahedrons represents the plurality of tetrahedrons that when combined together form the three-dimensional space. At step S204, one clipping section from the set of clipping sections and one tetrahedron from the set of tetrahedrons are selected. The one clipping section and one tetrahedron are then processed at step S206 to determine whether the one clipping section intersects the one tetrahedron. If they do not intersect at step S206, the set of tetrahedrons is updated at step S210 so the one tetrahedron will not be selected again to compare to the one clipping section. Steps S202-S206 are then repeated based on a newly selected tetrahedron. If the one clipping section and one tetrahedron do intersect at step S206, the tetrahedron is split into additional tetrahedrons at step S208. A description of this partitioning process is described later. Next, the set of tetrahedrons is updated based on the intersection of the one clipping section and the one tetrahedron to form a new set of tetrahedrons that are used to compare to other clipping sections.

Now that the one tetrahedron has been processed with the one clipping section, it is determined at step S212 whether there are additional tetrahedrons to compare to the one clipping section. If there are additional tetrahedrons at step S212, then steps S202-S206 are repeated by comparing the one clipping section to a newly selected tetrahedron. If not, it is determined at step S214 whether there are any more clipping sections from the set of clipping sections that have not been compared to the set of tetrahedrons. If there are additional clipping sections, then steps S202-S214 are repeated using an updated set of tetrahedrons that includes previously selected tetrahedrons and partitioned tetrahedrons. If not, then the partitioning process is completed and a partitioned three-dimensional modeled object is obtained.

Figure 3A:
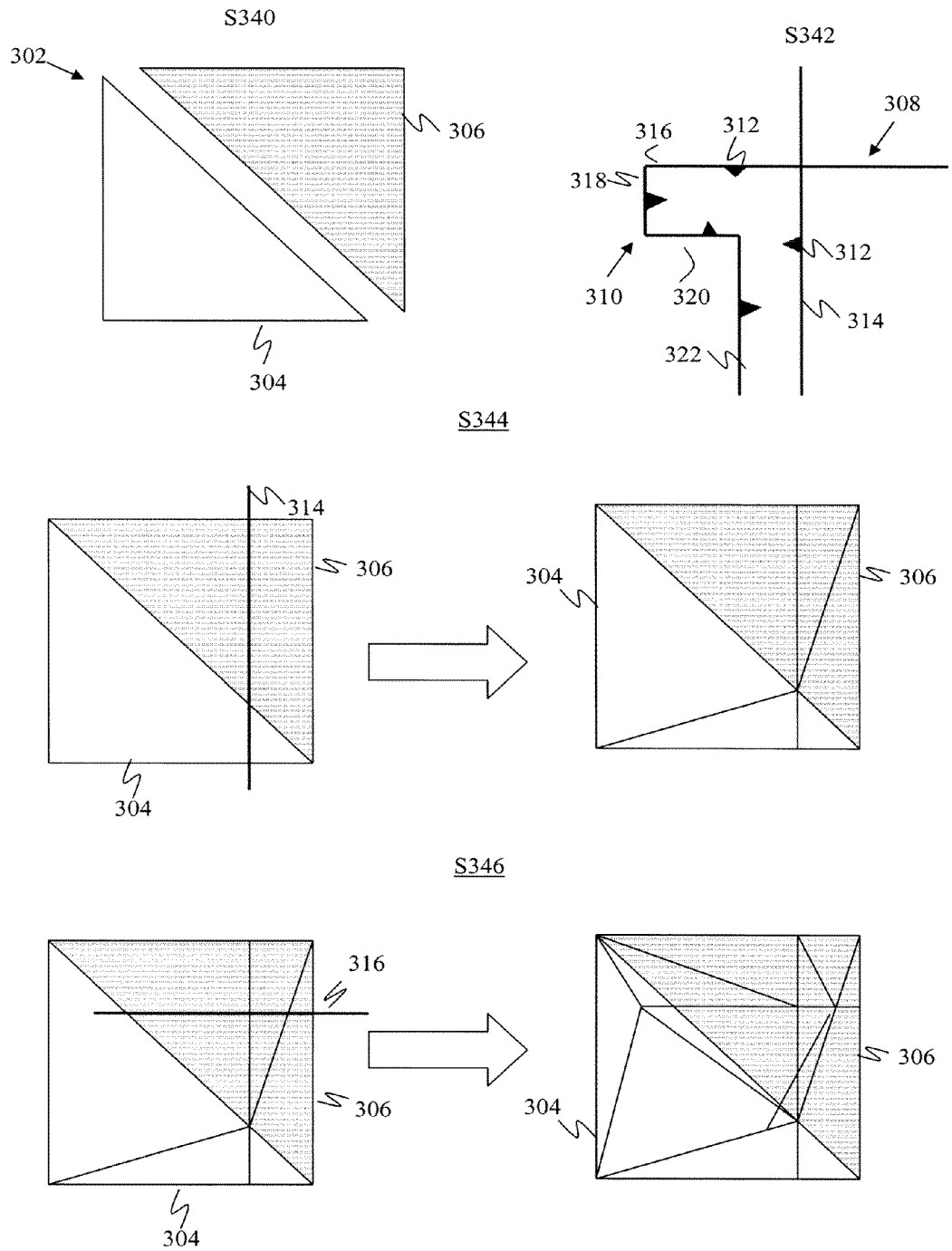
FIG. 3a is a two-dimensional diagram of a partitioned space based on one or more clipping shapes according to an exemplary embodiment of the present advancement.
Figure 3B:
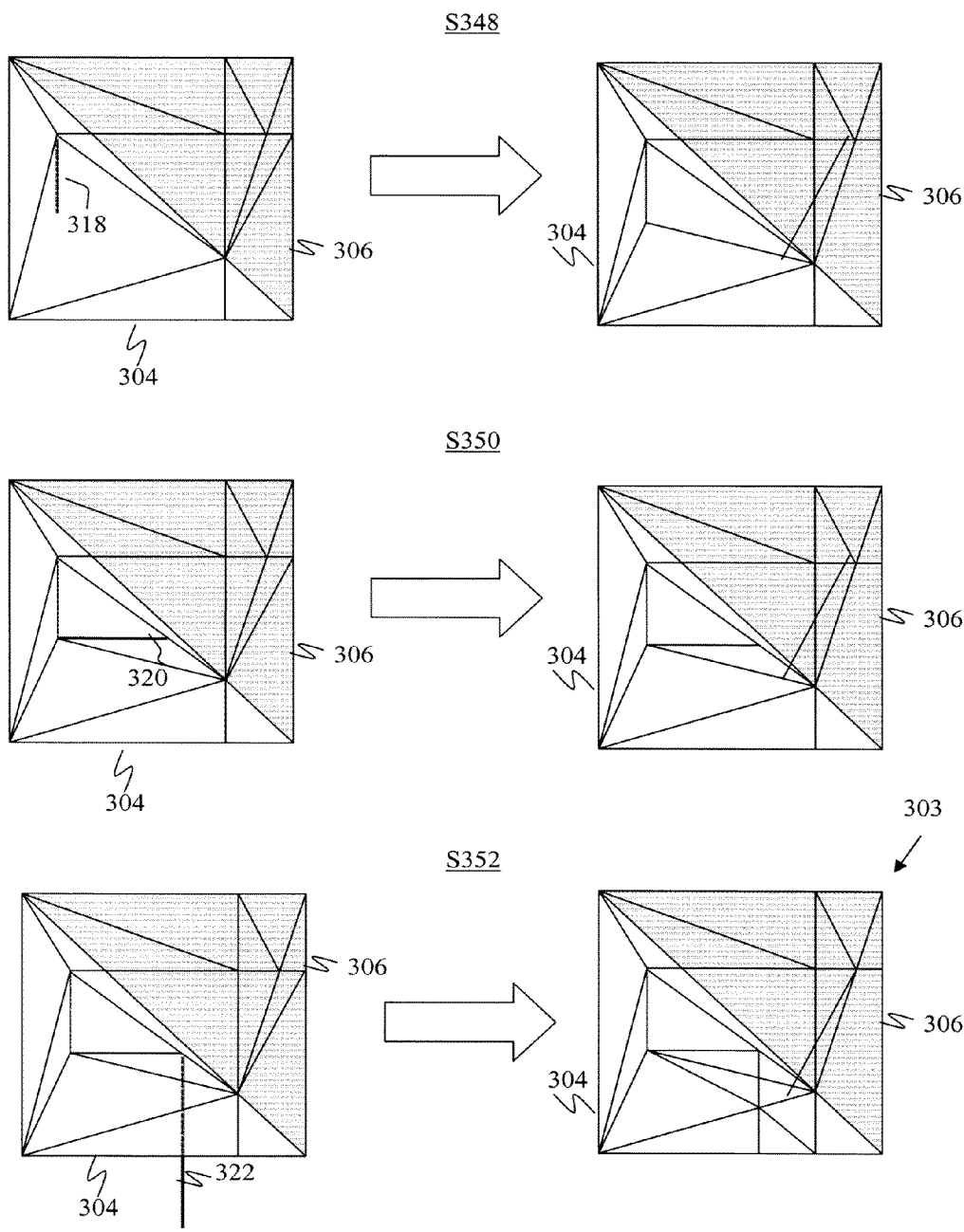
FIG. 3b is a two-dimensional diagram of a partitioned space based on one or more clipping shapes according to an exemplary embodiment of the present advancement.

FIGS. 3a and 3b are a two-dimensional flow diagram of partitioning a two-dimensional space according to Step 104 of FIG. 1 and corresponds to the algorithmic flow chart described in FIG. 2. It should be noted that FIGS. 3-8 illustrate the data preparation 101 and data rendering 103 of FIG. 1, respectively, using a two-dimensional space and two-dimensional modeled object. This is done for clarity, but as one of ordinary skill in the art would recognize, the descriptions provided herein with regard to FIGS. 3-8 are also applicable to a three-dimensional space and three-dimensional modeled object. For example, FIG. 9 is an overview of the three-dimensional process according to an exemplary embodiment of the present advancement.

FIGS. 3a and 3b are a two-dimensional flow diagram of partitioning a two-dimensional space 302 with respect to a first clipping shape 308 and second clipping shape 310 according to an exemplary embodiment of the present advancements. As noted above and according to one embodiment of the present advancements, the three-dimensional space is represented as a set of tetrahedrons. At step S340 of FIG. 3a, however, for the purposes of a two-dimensional analogous representation of a three-dimensional space, the two-dimensional space 302 is represented by a first main triangular region 304 and a second main triangular region 306.

At step S342 of FIG. 3a, at least one clipping shape is received by the CAD system. For this example, a first clipping shape 308, a second clipping shape 310 and corresponding clipping indicators 312 for each clipping shape are received by the CAD system. These clipping indicators 312 represent the direction at which to clip the two-dimensional space 302.

Once the first clipping shape 308 and the second clipping shape 310 have been received, a set of clipping sections are generated for each clipping shape 308 and 310. Clipping sections represent the set of planes that are associated with each clipping shape 308 and 310. Therefore, for the first clipping shape 308, only one clipping section 314 is generated. For the second clipping shape 310, four clipping sections 316, 318, 320 and 322 are generated.

At step S344 of FIG. 3*a*, clipping section 314 is selected to start the partitioning of the two-dimensional space 302. As noted above, the two-dimensional space 302 is defined by a set of triangular regions 304 and 306. Therefore, for every clipping section that intersects a triangular region of the two-dimensional space 302, new triangular regions are created. At step S344, the clipping section 314 intersects both the first main triangular region 304 and the second main triangular region 306 thereby creating new triangular regions. As there are no longer any clipping sections associated with the first clipping shape 308, clipping sections of the second clipping shape 310 are selected for processing.

At step S346 of FIG. 3*a*, clipping section 316 is applied to the two-dimensional space 302 that was previously partitioned according to clipping section 314. The application of clipping section 316 further partitions the two-dimensional space 302 into additional triangular regions as the clipping section 316 intersects triangular regions created in step S344 and passes from the second main triangular region 306 into the first main triangular region 304. Further, one unconnected endpoint of clipping section 316 that intersects the first main triangular region 304 causes four additional triangular regions to be generated within the first main triangular region 304.

At step S348 of FIG. 3*b*, three new triangular regions are created within the first main triangular region 304 as the clipping section 318 intersects a triangular region created in step S346.

At step S350 of FIG. 3*b*, only one additional triangular region is created within the first main triangular region 304 as the clipping section 320 intersects the triangular region created in step S348.

At step S352 of FIG. 3*b*, the remaining clipping section 322 generates additional triangular regions within the first main triangular region 304 as the clipping section 322 intersects a plurality of triangular regions created in steps S348 and S350. At this point, a partitioned two-dimensional space 303 has been generated that includes a plurality of triangular regions created by intersecting clipping sections of the first clipping shape 308 and the second clipping shape 310. Some of these triangular regions are bordered, or bounded, by the first and second clipping shapes 308 and 310 but do not intersect the first and second clipping shapes 308 and 310. At this point, however, the clipped volume domain, or the plurality of triangular regions that the are to be clipped, is still unknown.

Referring back to FIG. 1, the partitioning of the space has been completed and the data preparation 101 proceeds to calculate one or more clipped and unclipped volume domains of the partitioned space in step S106. The clipped volume domain represents the set of tetrahedrons bounded, but not intersected, by the clipping shapes based on the designated clipping indicators. It should be noted that the clipping indicators may not always correlate with each other. For example, if a single clipping indicator of a clipping shape indicates the volume domain as clipped and the other clipping indicators of other clipping shapes indicate the volume domain as unclipped, then the volume domain will be a clipped volume domain. In other words, in order to designate an unclipped volume domain, all clipping indicators must indicate the volume domain as unclipped without any opposing clipping indicators indicating a clipped volume domain.

Figure 4:
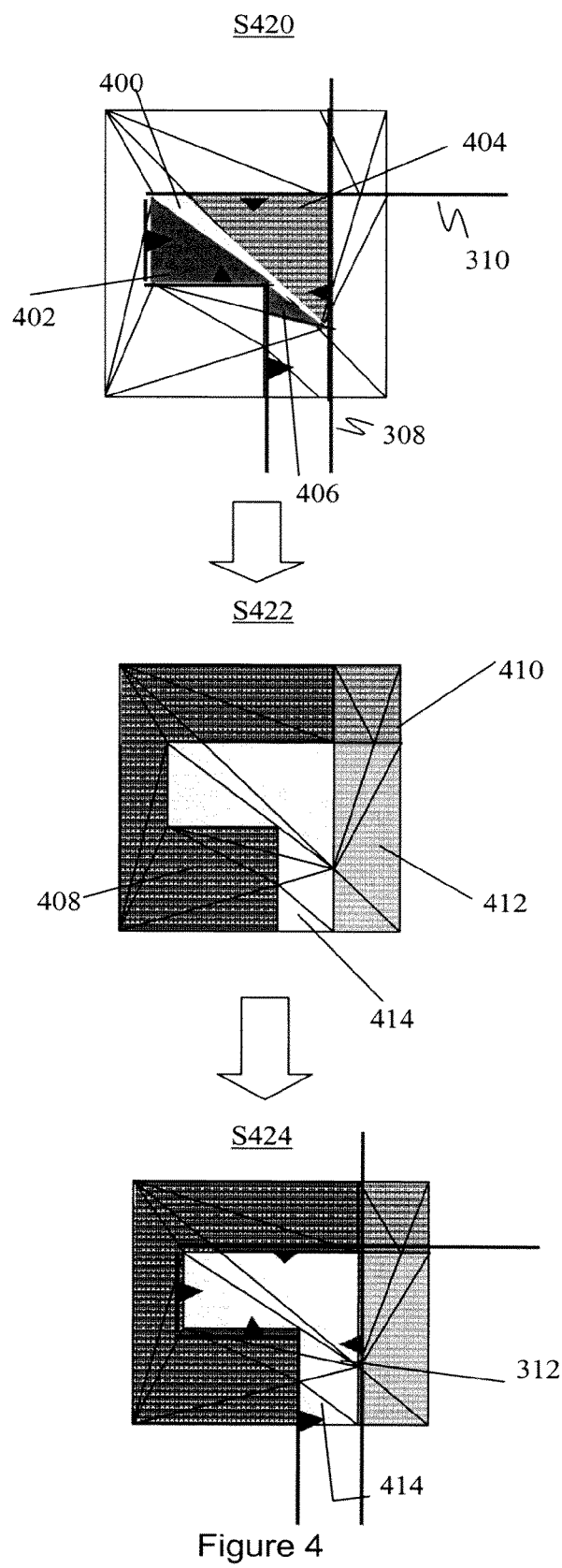
FIG. 4 is a two-dimensional diagram of calculating clipped and unclipped volume domains of a partitioned space according to an exemplary embodiment of the present advancement.

FIG. 4 is a two-dimensional flow diagram of calculating one or more clipped and unclipped volume domains of a the partitioned two-dimensional space 303. The clipped volume domains represent the triangular regions that will be clipped and the unclipped volume domains represent the triangular regions that will not be clipped.

At step S420, a first triangular region 400 is selected from the plurality of triangular regions of the partitioned two-dimensional space 303. Next, every triangular region that is adjacent to triangular region 400 is located. For example, triangular regions 402, 404 and 406 are adjacent to triangular region 400. It is then determined whether there are any clipping shapes between the selected triangular region 400 and its adjacent triangular regions 402, 404 and 406 to determine whether they are part of the same volume domain. As adjacent triangular regions 402, 404 and 406 are not separated from triangular region 400 by either the first clipping shape 308 or the second clipping shape 310, adjacent triangular regions 402 and 404 are part of the same volume domain. This operation is then repeated at step S422 for every triangular region of the partitioned two-dimensional space 303.

The result obtained at step S422 illustrates four different volume domains 408, 410, 412 and 414 that are defined based on the triangular regions of the partitioned two-dimensional space 303 and the first and second clipping shapes 308 and 310 as discussed above. However, at this point it is still unknown which volume domains represent the clipped and unclipped volume domains. As shown in step S424, the bordering clipping shapes of each volume domain are compared against the clipping indicators 312. In this example, volume domain 414 is the clipped volume domain and volume domains 408, 410 and 412 are the unclipped volume domains.

Referring back to FIG. 1, the clipped volume domains of step S106 have been determined and the data preparation 101 moves to step S108 to calculate one or more envelopes of the clipped volume domain. The clipped volume domain envelope is the planar faces of the clipping shapes or clipping sections that bound, but do not intersect, the clipped volume domain. As can be appreciated, the faces of the clipped volume domain envelope do not have to be planar faces of the clipping shapes but can be any non-planar faces depending on the definition of the clipping shapes.

Figure 5:
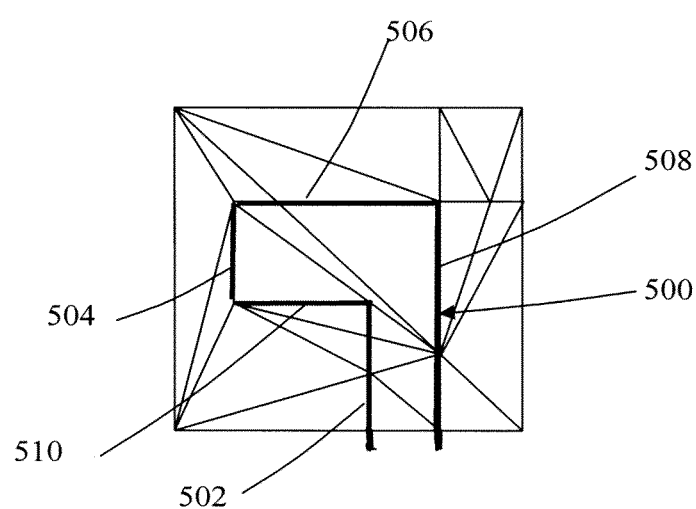
FIG. 5 is a two-dimensional diagram of calculating a clipped volume domain envelope according to an exemplary embodiment of the present advancement.

A two-dimensional diagram of the clipped volume domain envelope calculation is illustrated in FIG. 5 at step S510. To determine the clipped volume domain envelope, the planar boundaries, or faces, of the clipped volume domain are determined as shown by the clipped volume domain envelope 500. The faces 502, 504, 506, 508 and 510 of the clipped volume domain envelope 500 represent the planes of the clipped volume domain envelope 500 as well as portions of the clipping sections generated from the first and second clipping shapes 308 and 310. This completes the data preparation 101 of FIG. 1 and the clipped volume domain envelope 500 is ready to be used to render a clipped two-dimensional object.

Referring back to FIG. 1, one or more clipped volume domain envelopes of step S108 have been determined thereby completing the data preparation 101 steps. As can be appreciated, the data preparation 101 steps are unnecessary when a clipped volume domain envelope is directly defined by a user. Next, the clipped volume domain envelopes are projected onto the screen plane according to an angle, or viewpoint, at which the modeled object is being viewed.

The projection of a three-dimensional object onto a two-dimensional screen plane involves mapping three-dimensional points of the three-dimensional object as they would appear on a two-dimensional screen plane. Therefore, by projecting the clipped volume domain envelope onto the two-dimensional screen plane, each clipped volume domain envelope face is projected and its portion on the two-dimensional screen plane can be determined. As such, every time the viewpoint is changed, the clipped volume domain envelope must be again projected onto the screen plane so that the position of the clipped volume domain faces can be determined from the new viewpoint. As described later, these projected portions are then used when rendering the three-dimensional modeled object.

Figure 6A:
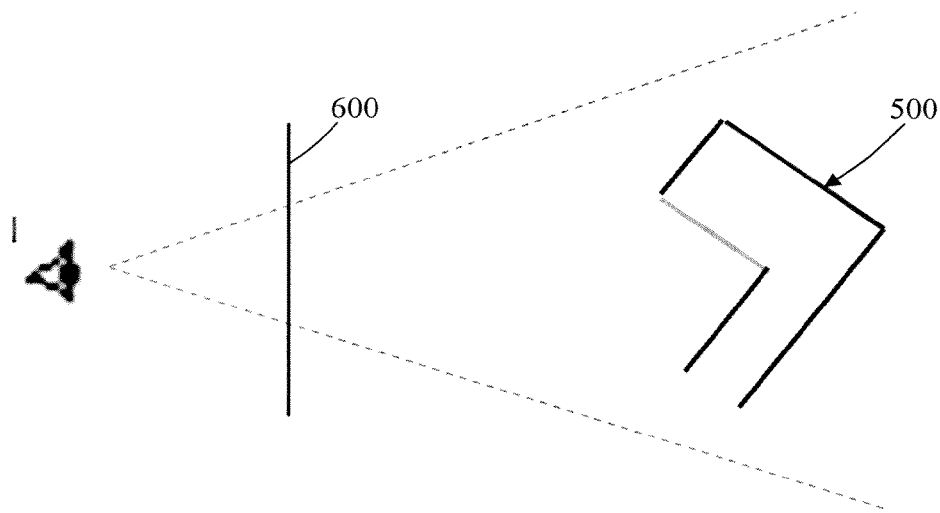
FIGS. 6a and 6b are two-dimensional diagrams of projecting the envelope of the clipped volume domain on a screen plane with respect to a viewpoint according to an exemplary embodiment of the present advancement.
Figure 6B:
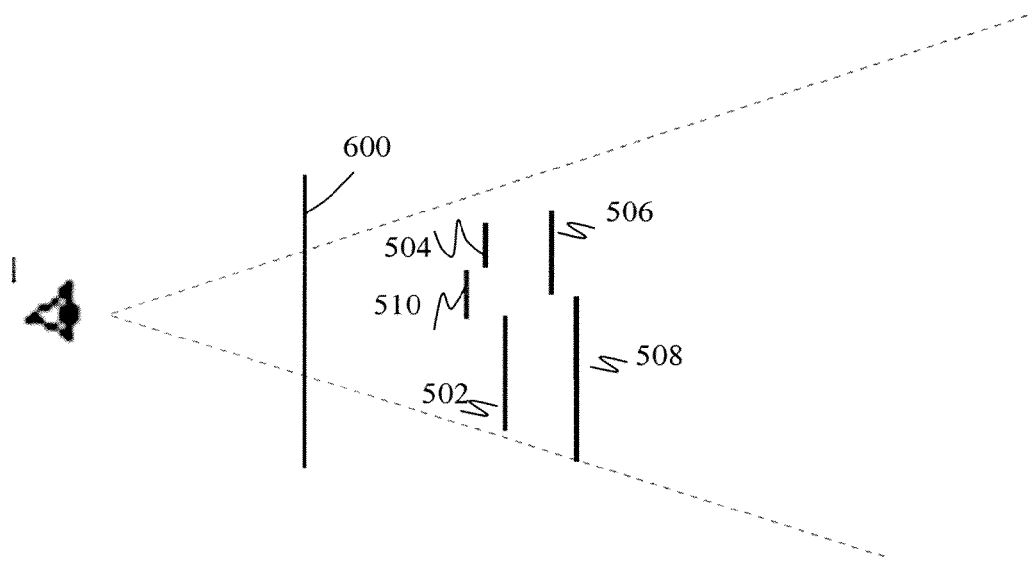

FIGS. 6a and 6b illustrate a two-dimensional representation of the projection of the clipped volume domain envelope 500 onto a screen plane 600 according to how a user would view the two-dimensional modeled object from a particular viewpoint. While the clipped volume domain envelope 500 is not actually displayed on the screen plane 600, FIG. 6a represents how the clipped volume domain envelope 500 would appear to the user when it is mapped onto the screen plane 600 according to the viewpoint.

FIG. 6b illustrates how the clipped volume domain envelope faces 502, 504, 506, 508 and 510 appear to a user based on a projection of the faces onto the screen plane 600. Based on the projection of the faces 502, 504, 506, 508 and 510 onto the screen plane 600, projected portions for the faces 502, 504, 506, 508 and 510, representing the faces as they would appear to a user from the viewpoint, can be determined.

Referring back to FIG. 1, after the projection of the clipped volume domain envelope, the screen plane is partitioned at step S112 into tiles based upon the projection of step S110. The tiles are different portions of the screen plane that when combined represent the entirety of the screen plane. The tiles are partitioned based upon the projection of the clipped volume domain envelope onto the screen plane. More specifically, the number of tiles that the screen plane is divided into is determined by the projection of the faces of the clipped volume domain envelope onto the screen plane and the portions of the screen plane that do not include any of the projected faces. For example, when projections of the clipped volume domain envelope faces overlap, a tile is created for the overlapping faces and the non-overlapping faces as well as any portions of the screen plane that do not include the projection of the clipped volume domain envelope.

Once the screen plane has been partitioned into one or more tiles, the clipped volume domain envelope faces are linked to the tiles in which they are located based on the projection of the clipped volume domain envelope onto the screen plane. Therefore, each tile contains information describing the clipped volume domain envelope faces located in that tile as well as planar equations of those clipped volume domain envelope faces.

Figure 7A:
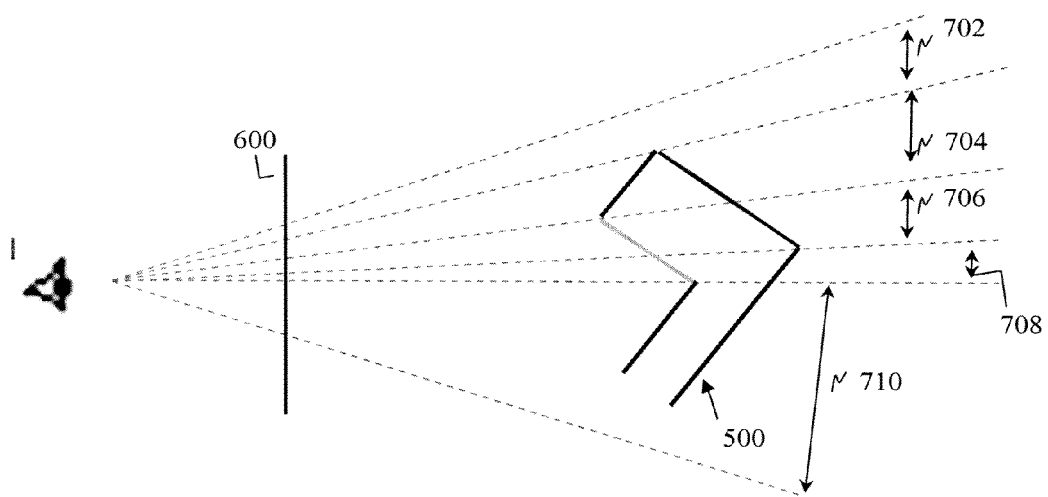
FIGS. 7a and 7b are two-dimensional diagrams of partitioning the screen plane into tiles with respect to the clipped volume domain envelope according to an exemplary embodiment of the present advancement.
Figure 7B:
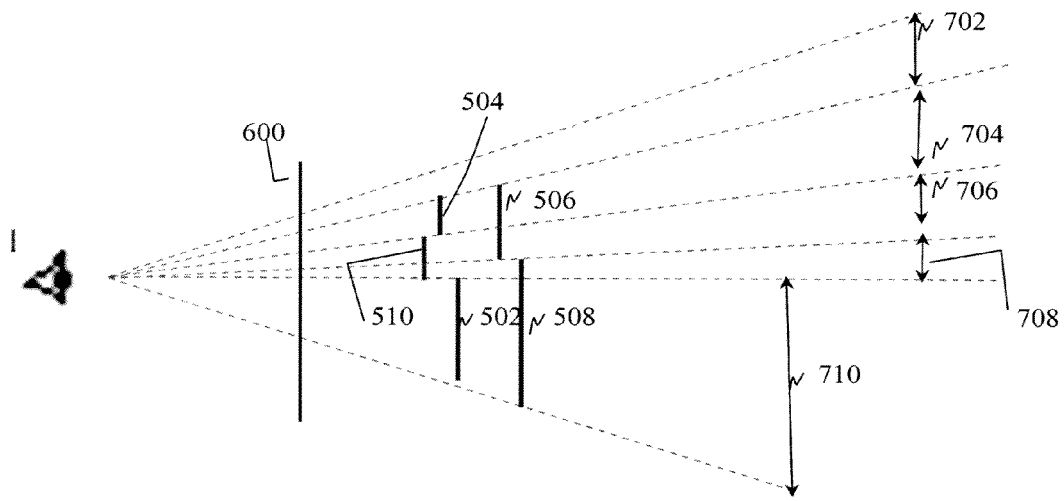

FIGS. 7a and 7b illustrate a two-dimensional partitioning of the screen plane 600 into tiles based on the projection of the clipped volume domain envelope 500 onto the screen plane 600. In FIG. 7a, the screen plane 600 is divided into five tiles 702, 704, 706, 708 and 710 based on the projection of the clipped volume domain envelope 500 onto the screen plane 600. As the projection of the clipped volume domain envelope does not map to the entire screen plane 600, tile 702 is created for the space between the projected clipped volume domain envelope 500 and the remainder of the screen plane 600.

FIG. 7b illustrates how the tiles are generated based on the overlap of the clipped volume domain envelope faces 502, 504, 506, 508 and 510. A different tile is created for every overlap of the clipped volume domain envelope faces 502, 504, 506, 508 and 510 to form the tiles 704, 706, 708 and 710. Next, corresponding planar equations of the clipped volume domain envelope faces 502, 504, 506, 508 and 510 are linked to the corresponding tiles in which the faces 502, 504, 506, 508 and 510 are located. For example, the tile 702 does not contain any clipped volume domain envelope faces. The tile 704 contains both faces 504 and 506. The third tiles contains faces 506 and 510. The fourth tiles contains faces 508 and 510 and the fifth tile contains faces 502 and 508.

Referring back to FIG. 1, once the tiles linked with respective planar equations are determined, a tiled image object is generated at step S113 that includes the tiles created based on the projection of the clipped volume domain envelope onto the screen plane. The tiled image object can be a frame buffer or any other type of storage for graphical data as would be recognized by one of ordinary skill in the art. Each tile is assigned a different color in the tiled image object as an index into a planar equations tab that includes the planar equations of the clipped volume domain envelope faces for each tile. In other words, the color represents an index into the planar equations tab depending on what tile is assigned to that particular color. However, one of ordinary skill in the art would recognize that any designation, such as numbers or characters, could also be used as an index into the planar equations tab. To ensure a similar pixel count, the tiled image object is the same size as a final image that will display the clipped three-dimensional modeled object. The tiled image object indexing the planar equations tab and the planar equation tab are then transmitted to a fragment shader in order to render the three-dimensional modeled object.

The data rendering 103 then proceeds to render and display the clipped-three dimensional object at step S114. In this step, three-dimensional surfaces of the three-dimensional modeled object are transmitted to a graphical driver and rasterized to convert each surface into set of fragments, where the three-dimensional surface is displayed on a set of pixels. The graphical driver then applies the fragment shader for each fragment in order to remove fragments of the three-dimensional modeled object based on the tiled image object and planar equations tab determined in step S112. In other words, a three-dimensional surface of the three-dimensional modeled object provided to the graphical driver which then rasterizes the three-dimensional surface into a set of fragments by projecting it onto the screen plane. Next, the projected location of each fragment is compared to the tiled image object to determine which tile contains the selected fragment. The color assigned to this tile of the tiled image object is then used to index the planar equations tab for clipped volume domain envelope faces located in this tile. A scalar product of the clipped volume domain faces' equations with the fragment coordinates can then determine whether the fragment is located within the clipped volume domain or outside the clipped volume domain. If the fragment is located within the clipped volume domain, the fragment shader informs the graphical driver that it should not render the fragment. If the fragment is located outside the clipped volume domain, the fragment shader informs the graphical driver that it should render the fragment. This process is repeated for every fragment of the rasterized three-dimensional modeled object.

Figure 8:
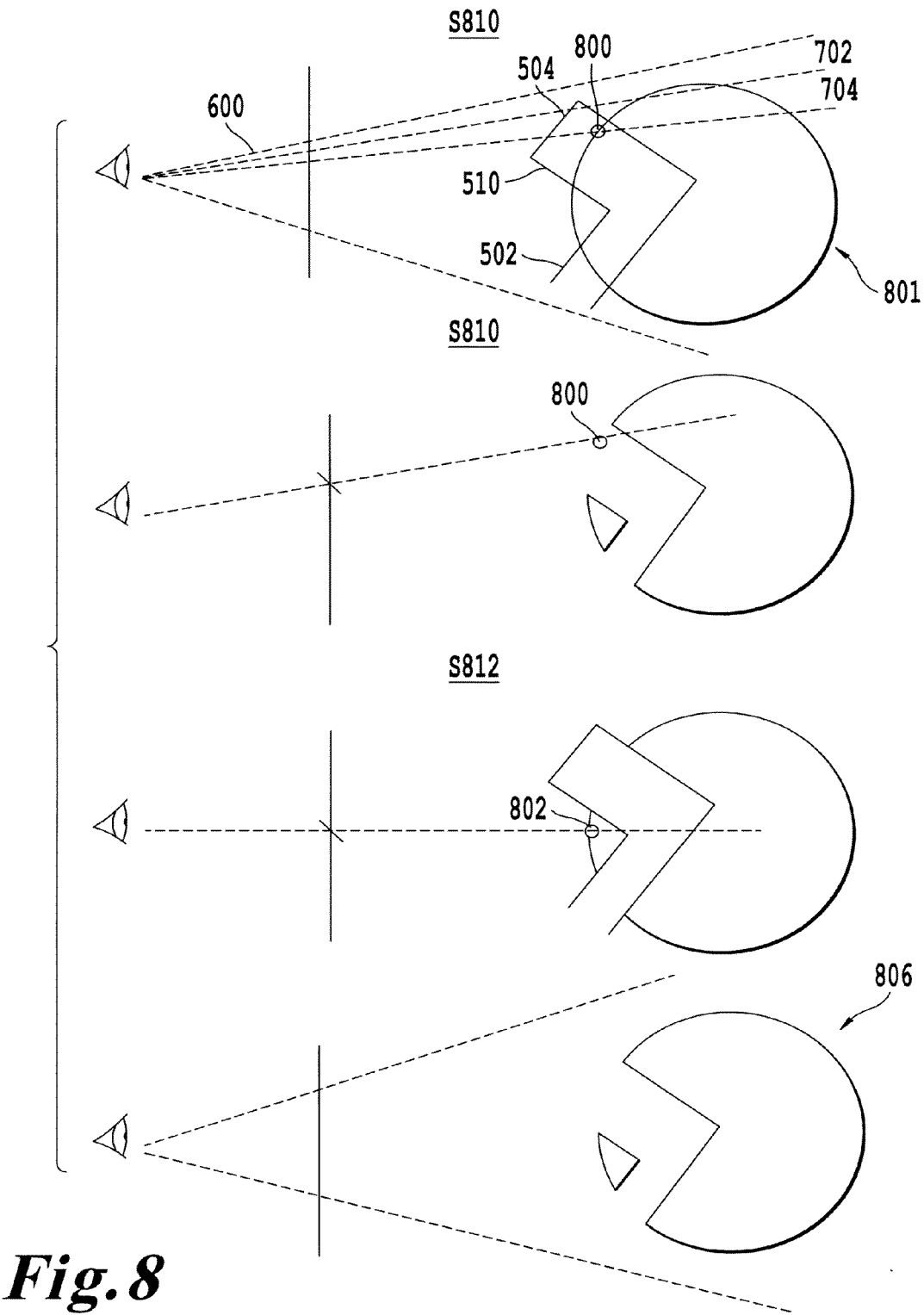
FIG. 8 is a two-dimensional diagram of rendering the clipped object according to an exemplary embodiment of the present advancement.

FIG. 8 is a two-dimensional diagram illustrating the rendering process on a two-dimensional modeled object 801. At step S810, the two-dimensional modeled object 801 surfaces are transmitted to the graphical driver to be rasterized into a set of fragments having corresponding pixel points. In other words, the fragment 800 is projected onto the screen plane 600. By projecting the fragment 800 onto the screen plane 600, the tile at which the fragment 800 is located can be calculated. The fragment 800 is then applied to the fragment shader to determine whether or not to render the fragment. In FIG. 8, the fragment 800 is located in tile 704. The color associated with tile 704 in the tiled image object is then used as an index into the planar equations tab to identify the clipped volume domain envelope 500 planar equations for faces 504 and 506 that are associated with tile 704. The scalar product of face 504 and the coordinates of the fragment 800, and the scalar product of the face 506 and the coordinates of the fragment 800 are then calculated to determine the location of the fragment 800 with respect to the faces 504 and 506. It can then be determined whether the fragment 800 is located within the clipped volume domain envelope 500 or not based on its location with respect to faces 504 and 506 of tile 704. As the fragment 800 is located within the clipped volume domain envelope 500 by being between faces 504 and 506, the fragment 800 is not rendered. This process is repeated for each fragment of the two-dimensional modeled object.

For example, as can be seen in step S812, the fragment 802 is located in front of the clipped volume domain envelope 500 and is therefore rendered. Accordingly, any fragment located outside the clipped volume domain envelope 500 is rendered and any fragment located within the clipped volume domain envelope 500 is not rendered. The resulting clipped two-dimensional modeled object 806 is then displayed.

Referring back to FIG. 1, once the three-dimensional modeled object has been rendered and displayed, it is determined whether a new viewpoint has been designated at step S116. If a new viewpoint has been designated at step S116, the data rendering 103 is repeated to render the clipped-three dimensional modeled object again based on the new viewpoint. If not, it is determined at step S118 whether any new clipping shapes have been defined. If no new clipping shapes have been received, then the process loops back to step S114 to determine whether the viewpoint has been modified. If new clipped shapes have been received, steps S104-S114 are repeated to prepare the data and render the three-dimensional modeled object based on the new clipping shapes.

Figure 9A:
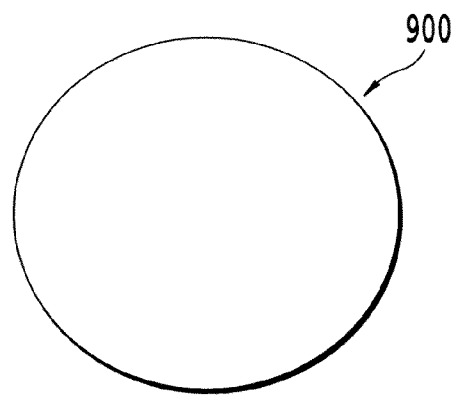
FIGS. 9a through 9e are three-dimensional diagrams of clipping and rendering a three-dimensional modeled object according to an exemplary embodiment of the present advancement.

As noted above, the process of FIG. 1 is illustrated through reference to the two-dimensional description provided in FIGS. 3-8. FIGS. 9a-9e provide a three-dimensional overview of clipping and rendering a three-dimensional modeled object according to the steps of FIG. 1. FIG. 9a represents a three-dimensional object 900 as it appears before any clipping shapes have been applied to clip a portion of the three-dimensional object 900. As noted above, the three-dimensional object 900 includes of a plurality of fragments that when combined together form the dimensions of the three-dimensional object 900.

Figure 9B:
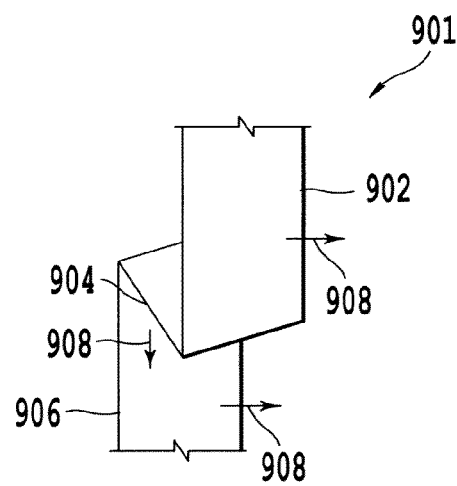

FIG. 9b illustrates a clipping shape 901 that is generated to clip the three-dimensional object 900. The clipping shape 901 has three clipping sections 902, 904 and 906 as well as clipping indicators 908. As described in FIG. 1 with respect to steps S104 through S108, a three-dimensional space is then partitioned based on the clipping shape 901 to determine a clipped volume domain, unclipped volume domain and a clipped volume domain envelope.

Figure 9C:
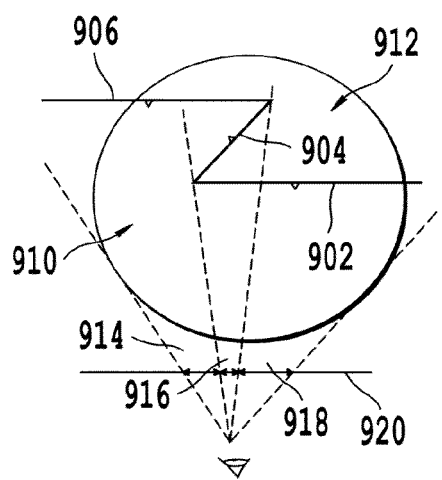

FIG. 9c illustrates an overhead view of the three-dimensional object 900 clipped by clipping shape 901 into a clipped volume domain 910 and an unclipped volume domain 912. Clipped volume domain 910 is the part of the spherical model that will be removed during the rendering. As there is only one clipping shape 901, the clipped volume domain 910 includes every portion of the three-dimensional space in a direction indicated by the clipping indicators 908 and the unclipped volume domain 912 includes every portion of the three-dimensional space in a direction opposite of that indicated by the clipping indicators 908. Further, as there is only one clipping shape 901, the clipped volume domain envelope is the same as the clipping shape 901 and includes the clipping sections 902, 904 and 906 as faces of the clipped volume domain envelope 901. FIG. 9c also shows three tiles 910, 912 and 914 that are created based on the projection of the clipped volume domain envelope 901 onto the screen plane 920.

Figure 9D:
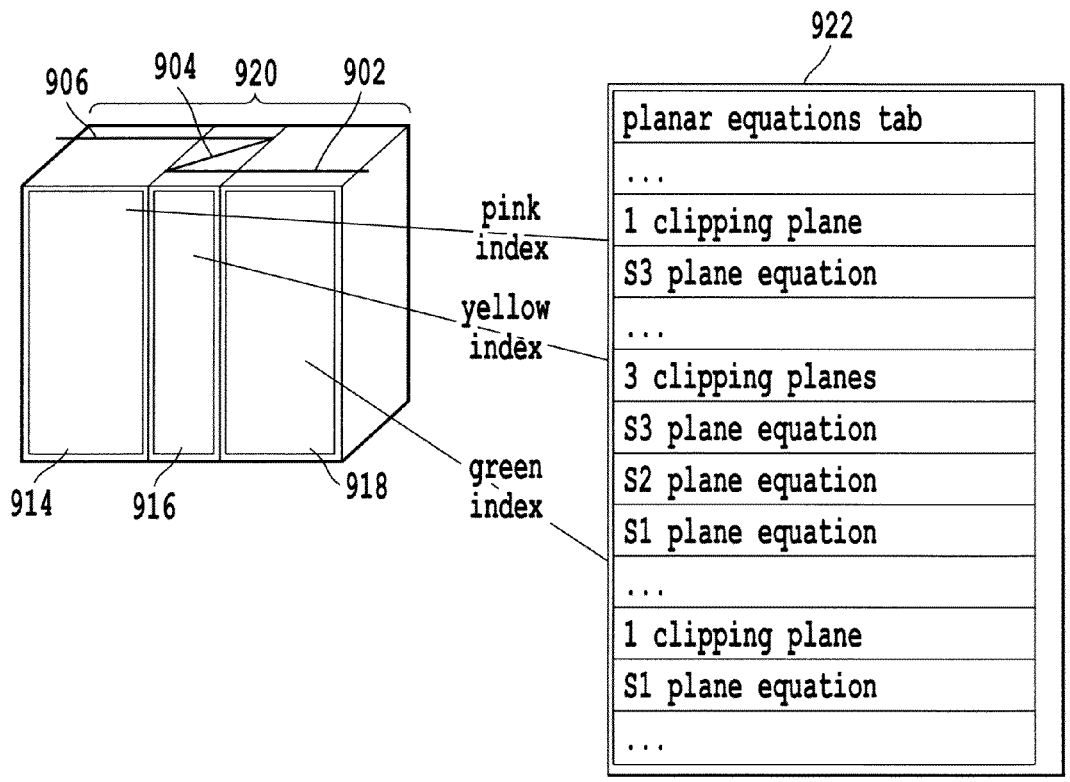

FIG. 9d illustrates a front view of the projection of the clipped volume domain envelope 901 onto the screen plane 920. Tiles 914 and 918 are generated for the portions of the clipped volume domains faces 902 and 906 that are not overlapping. Further, tile 916 is generated for the portions of the clipped volume domain envelope faces 902, 904 and 906 that overlap each other. The clipped volume domain envelope faces 902, 904 and 906 are then linked with the respective tiles in which they are located. Thus, face 902 is linked with tile 914 and 916, face 904 is linked with tile 916, and face 906 is linked with 918. Each tile is then assigned a different color. Tile 914 is assigned the color pink, tile 916 is assigned the color yellow, and tile 918 is assigned the color green. The tiles 914, 916 and 918 linked to the faces 902, 904, 906 of the clipped volume domain envelope 901 as well as the assigned colors are then stored in the tiled image object. Further, based on the projection of the clipped volume domain envelope 901, planar equations for the clipped volume domain envelope faces 902, 904 and 906 are recorded in a planar equations tab 922. In the planar equations tab, the number of clipped volume domain envelope faces and their respective planar equations are stored and linked to the color assigned to the tile having those particular clipped volume domain envelope faces. For example, in FIG. 9d, the color yellow represents tile 916 and is therefore an index into planar equations tab 922 storing the number of clipped volume domain envelope faces and their respective planar equations. For tile 916, the planar equations tab 922 stores three clipped volume domain envelope faces 902, 904, and 906 and their respective planar equations.

The tiled image object having the color assignments for the tiles 914, 916 and 918 linked to clipped volume domain envelope faces 902, 904 and 906, and the planar equations tab 922 are then transmitted as parameters to the fragment shader, along with the three-dimensional object 900 fragment data, to render a clipped three-dimensional object. A fragment from the three-dimensional object 900 is projected onto the screen plane 920 and it is determined at which tile of the screen plane 920 the fragment is located in. Once the tile is determined, the color of that tile indexes the planar equations tab 922 and the fragment coordinates are compared to the location of the planar equations for the clipped volume envelope domain faces for that particular tile. In this example, if the fragment is in front of the clipped volume domain envelope 901 with respect to the clipping indicators 908, the fragment is not rendered. If the fragment is not in front of the clipped volume domain envelope 901, the fragment is rendered.

Figure 9E:
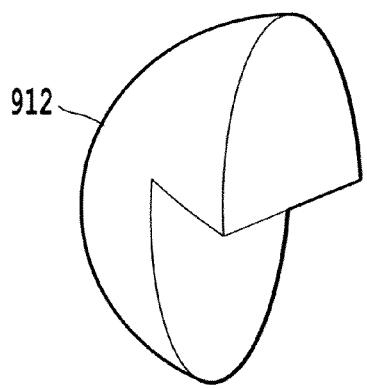

The resulting clipped three-dimensional object 924 based on the above-noted rendering for clipping shape 901 is displayed in FIG. 9e. In FIG. 9e, the unclipped volume domain 912 remains while the clipped volume domain 910 has been removed during the rendering process.

Based on the data preparation 101 as described in FIG. 1 above, the CAD system is able to render the clipped three-dimensional modeled object in one rendering pass merely by performing steps S108-S112 of the data rendering 103. In other words, the CAD system can easily render the clipped-three-dimensional modeled object whenever the viewpoint is changed in one rendering pass rather than having to perform a rendering for each infinite clipping section as is done with conventional methods. This provides a more efficient way of rendering clipped three-dimensional modeled objects. The above-noted process described in FIG. 1 also enables more complex clipping shapes to be designated and mixed while still providing efficient and accurate rendering of three-dimensional modeled objects.

Figure 10:
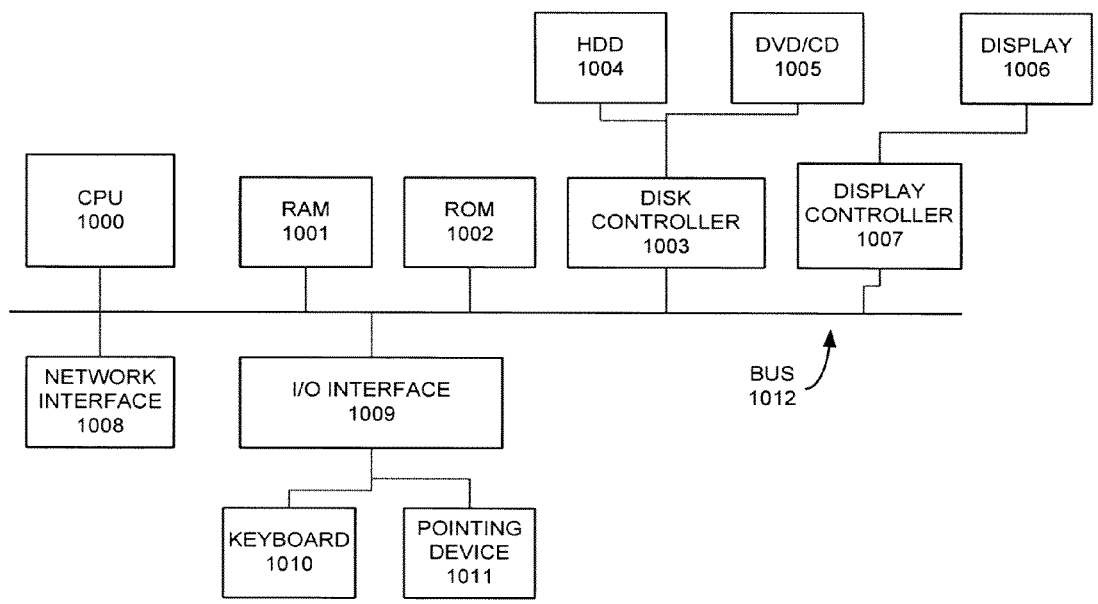
FIG. 10 is a schematic diagram of a computer aided design station according to an exemplary embodiment of the present advancement.

Next, a hardware description of a computer aided design station according to exemplary embodiments of the present advancement is described with reference to FIG. 10. In FIG. 10, the computer aided design station includes a CPU 1000 which performs the processes described above. The process data and instructions may be stored in memory such as RAM 1001 or ROM 1002. These processes and instructions may also be stored on hard disk drive (HDD) 1004 or DVD/CD drive 1005, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer aided design station communicates, such as a server or computer.

Further, the claimed advancements may be provided as a utility application, background daemon, or component of an operating system, or combination thereof, executing in conjunction with CPU 1000 and an operating system such as Microsoft VISTA, Microsoft Windows 7, UNIX, Solaris, LINUX, Apple MAC-OS and other systems known to those skilled in the art.

CPU 1000 may be a Xenon processor from Intel of America or an Opteron processor from AMD of America, or may be other processor types, such as a Freescale ColdFire, IMX, or ARM processor from Freescale Corporation of America. Alternatively, the CPU 1000 may be a processor such as a Corel Duo from Intel Corporation of America, or may be implemented on an FPGA, ASIC, PLD or using discrete logic circuits, as one of ordinary skill in the art would recognize. Further, CPU 1000 may be implemented as multiple processor cooperatively working to perform the instructions of the inventive processes described above.

The computer aided design station in FIG. 10 also includes a network interface 1008, such as an Intel Ethernet PRO network interface card from Intel Corporation of America, for interfacing with a network, such as a local area network (LAN), wide area network (WAN), the Internet and the like. The computer aided design station further includes a display controller 1007, such as a NVIDIA GeForce GTX graphics adaptor from NVIDIA Corporation of America for interfacing with display 1006, such as a Hewlett Packard HPL2445w LCD monitor. A general purpose I/O interface 1009 interfaces with a keyboard 1010 and pointing device 1011, such as a roller ball, mouse, touchpad and the like.

Disk controller 1003 connects HDD 1004 and DVD/CD 1005 with communication bus 1012, which may be an ISA, EISA, VESA, PCI, or similar, for interconnecting all of the components of the computer aided design station. A description of the general features and functionality of the display 1006, keyboard 1010, pointing device 1011, as well as the display controller 1007, disk controller 1060, network interface 1008 and I/O interface 1009 is omitted herein for brevity as these features are known.

Figure 11:
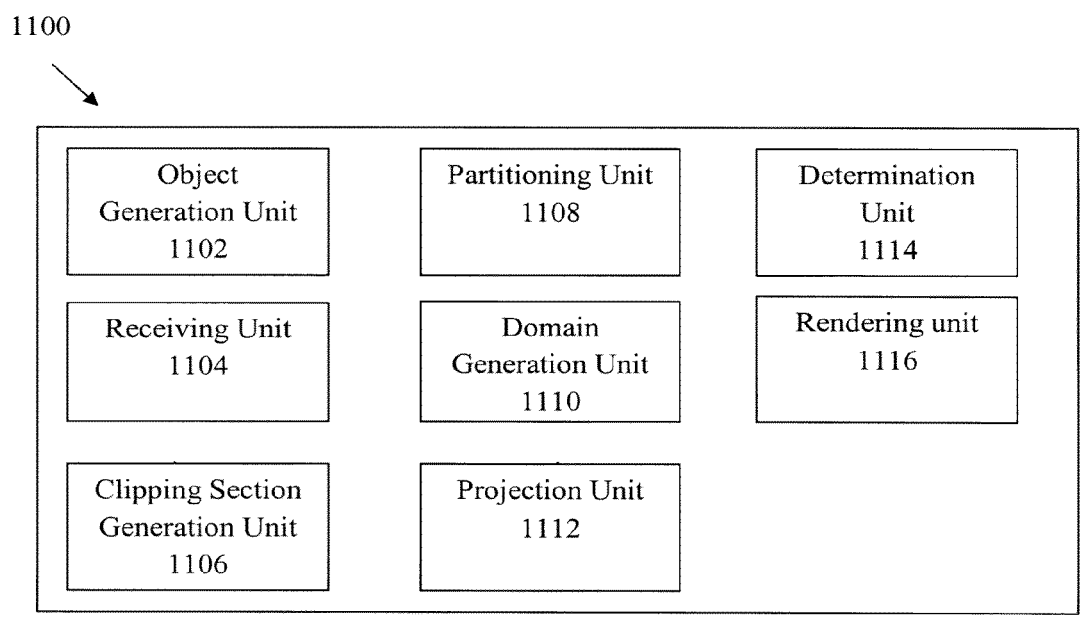
FIG. 11 is a schematic diagram of a processor of the computer aided design station according to an exemplary embodiment of the present advancement.

FIG. 11 describes a processor 1100 for rendering a clipped three-dimensional modeled object. Processor 1100 is an example of the CPU 1000 described in FIG. 10. The processor 1100 includes at least an object generation unit 1102, receiving unit 1104, clipping section generation unit 1106, partitioning unit 1108, domain generation unit 1110, projection unit 1112, determination unit 1114 and rendering unit 1116. The object generation unit 1102 generates the three-dimensional modeled object. The receiving unit 1104, clipping section generation unit 1106, and partitioning unit 1108 partition the three-dimensional modeled object according to step S104 of FIG. 1. The domain generation unit 1110 generates the at least one clipped volume domain having the envelope composed of faces according to step S106. In other words, the receiving unit 1104, clipping section generation unit 1106, and partitioning unit 1108 determine how the three-dimensional modeled object will be clipped by gathering information with respect to at least one clipped volume domain and at least one clipped volume domain envelope.

The projection unit 1112 projects the envelope of the at least one clipped volume domain onto the screen plane according to the first viewpoint according to step S106 of FIG. 1. The determination unit 1114 partitions the screen plane into tiles and creates the tiled image object according to steps S112 and S113. The rendering unit 1114 renders the three dimensional modeled object according to step S114 of FIG. 1. In other words, the projection unit 1112, determination unit 1114 and rendering unit 1116 project the three-dimensional modeled object onto the screen plane according to the viewpoint and render the clipped three-dimensional modeled object according to the viewpoint and the information gathered from the receiving unit 1104, clipping section generation unit 1106, partitioning unit 1108, and domain generation unit 1110.

Any processes, descriptions or blocks in flowcharts described herein should be understood as representing modules, segments, or portions of code which include one or more executable instructions for implementing specific logical functions or steps in the process, and alternate implementations are included within the scope of the exemplary embodiment of the present advancements in which functions may be executed out of order from that shown or discussed, including substantially concurrently or in reverse order depending upon the functionality involved.

Obviously, numerous modifications and variations of the present advancements are possible in light of the above teachings. It is therefore to be understood that within the scope of the appended claims, the present advancements may be practiced otherwise than as specifically described herein.

The invention claimed is:

1. A method to cause a computer aided design station to render a clipped three-dimensional modeled object, comprising:

generating a three-dimensional modeled object designed with the computer-aided design station;

partitioning the three-dimensional modeled object into a three-dimensional space having a plurality of regions, wherein the shape of the plurality of regions is selected from a group of tetrahedron, cube, and rhombohedron;

receiving one or more clipping shapes each having one or more connected planes, each plane including a clipping domain indicator on a side thereof to indicate a clipping direction;

generating one or more clipping sections based on the one or more clipping shapes and partitioning the regions into a plurality of sub-regions as a function of intersections between the clipping sections and already partitioned regions and sub-regions of the three-dimensional space, wherein the shape of the plurality of sub-regions are the same as the shape of the plurality of regions, and wherein the plurality of sub-regions are defined by points that include intersection points created by the intersections;

generating, based in part on the partitioning of the regions, at least one clipped volume domain having an envelope composed of planar faces, the envelope representing a planar boundary of the clipped volume domain;

projecting the envelope of the at least one clipped volume domain on a screen plane according to a first viewpoint;

determining, according to each pixel of the screen plane with respect to the first viewpoint, which faces of the envelope are projected onto each pixel; and rendering, by a processor of the computer aided design station and according to the first viewpoint, the three-dimensional modeled object as clipped based on the clipped volume domain and results of the determining.

2. The method according to claim 1, further comprising:

partitioning the three-dimensional space into the sub-regions based on the clipping domain indicator to generate the at least one clipped volume domain, wherein the one or more clipping sections each correspond to a different plane of the clipping shapes.

3. The method according to claim 2, wherein the partitioning includes repeatedly dividing the three-dimensional space with each clipping section to create a plurality of tetrahedron-shaped regions as the plurality of sub-regions.

4. The method according to claim 2, wherein the at least one clipped volume domain includes one or more regions bounded by the one or more clipping sections in a direction indicated by the clipping domain indicator.

5. The method according to claim 4, wherein the faces of the envelope are planes of the envelope.

6. The method according to claim 4, wherein the faces of the envelope of the at least one clipped volume domain include surfaces of the regions bordering the at least one clipped volume domain.

7. The method according to claim 5, wherein the determining comprises:

partitioning the screen plane into a plurality of tiles having respective pixels located therein; and assigning the one or more faces to the plurality of tiles based on the projection of the envelope with respect to the first viewpoint.

8. The method according to claim 7, wherein the determining further includes storing an equation of each face of each tile on the screen plane.

9. The method according to claim 8, wherein the determining further includes generating a rendering index for each tile, and linking the rendering index for each tile to respective stored equations of each face of each tile.

10. The method according to claim 1, wherein the rendering comprises:

receiving a fragment of the three-dimensional modeled object; and comparing a location of the fragment on the screen plane to the projected faces of the envelope.

11. The method according to claim 9, wherein the rendering comprises:

receiving a fragment of the three-dimensional modeled object;

comparing a location of the fragment to the partitioned screen plane to determine at which tile the fragment is located;

obtaining the stored equation of each face via the rendering index of the tile at which the fragment is located; and comparing the location of the fragment to the equation of each face.

12. The method according to claim 11, wherein the rendering further includes rendering fragments outside of the envelope based on results of the comparing.

13. The method according to claim 12, wherein each tile is assigned a different color as the rendering index and the equation of each face of each tile is determined by accessing the stored equation of each face based on the color of the tile.

14. The method according to claim 12, further comprising:

repeating the generating, projecting, determining and rendering steps when one or more new clipping shapes are received.

15. The method according to claim 12, further comprising:

receiving an input to change the first viewpoint; and repeating the projecting, determining and rendering steps and not the generating steps when the first viewpoint is changed.

16. A computer aided design station for rendering a clipped three-dimensional modeled object, comprising:

processing circuitry configured to generate a three-dimensional modeled object designed with the computer-aided design station, partition the three-dimensional modeled object into a three-dimensional space having a plurality of regions, wherein the shape of the plurality of regions is selected from a group of tetrahedron, cube, and rhombohedron;

receive one or more clipping shapes each having one or more connected planes, each plane including a clipping domain indicator on a side thereof to indicate a clipping direction;

generate one or more clipping sections based on the one or more clipping shapes and partition the regions into a plurality of sub-regions as a function of intersections between the clipping sections and already partitioned regions and sub-regions of the three-dimensional space, wherein the shape of the plurality of sub-regions are the same as the shape of the plurality of regions, and wherein the plurality of sub-regions are defined by points that include intersection points created by the intersections;

generate, based in part on the partitioning of the regions, at least one clipped volume domain having an envelope composed of planar faces, the envelope representing a planar boundary of the clipped volume domain;

project the envelope of the at least one clipped volume domain on a screen plane according to a first viewpoint, determine, according to each pixel of the screen plane with respect to the first viewpoint, which faces of the envelope are projected onto each pixel, and render, according to the first viewpoint, the three-dimensional modeled object as clipped based on the clipped volume domain and results of the determining.

17. The computer aided design station according to claim 16, wherein the processing circuitry is further configured to partition the three-dimensional space into the sub-regions based on the clipping domain indicator to generate the at least one clipped volume domain, wherein the one or more clipping sections each correspond to a different plane of the clipping shapes.

18. The computer aided design station according to claim 17, wherein when partitioning the three-dimensional space, the processing circuitry repeatedly divides the three-dimensional space with each clipping section to create a plurality of tetrahedron-shaped regions as the sub-regions.

19. The computer aided design station according to claim 17, wherein the at least one clipped volume domain includes one or more regions bounded by the one or more clipping sections in a direction indicated by the clipping domain indicator.

20. The computer aided design station according to claim 19, wherein the faces of the envelope are planes of the envelope.

21. The computer aided design station according to claim 19, wherein the faces of the envelope of the at least one clipped volume domain include surfaces of the regions bordering the at least one clipped volume domain.

22. The computer aided design station according to claim 20, wherein processing circuitry is further configured to
partition the screen plane into a plurality of tiles having respective pixels located therein, and
assign the one or more faces to the plurality of tiles based on the projection of the envelope with respect to the first viewpoint.

23. The computer aided design station according to claim 22, wherein the processing circuitry stores an equation of each face of each tile on the screen plane.

24. The computer aided design station according to claim 23, wherein the processing circuitry is further configured to
generate a rendering index for each tile, and
link the rendering index for each tile to respective stored equations of each face of each tile.

25. The computer aided design station according to claim 16, wherein the processing circuitry is configured to
receive a fragment of the three-dimensional modeled object, and
compare a location of the fragment on the screen plane to the projected faces of the envelope.

26. The computer aided design station according to claim 24, wherein the processing circtuitry is configured to
receive a fragment of the three-dimensional modeled object,
compare a location of the fragment to the partitioned screen plane to determine at which tile the fragment is located,
obtain the stored equation of each face via the rendering index of the tile at which the fragment is located, and
compare the location of each fragment to the equation of each face.

27. The computer aided design station according to claim 26, wherein the processing circuitry renders fragments outside of the envelope based on results of the comparison of the location of each fragment to the equation of each face.

28. The computer aided design station according to claim 27, wherein each tile is assigned a different color as the rendering index and the equation of each face of each tile is determined by accessing the stored equation of each face based on the color of the tile.

29. A non-transitory computer-readable medium storing computer readable instructions thereon that when executed by an information processing apparatus cause the information processing apparatus to perform a method comprising:
generating a three-dimensional modeled object designed with a computer-aided design station;
partitioning the three-dimensional modeled object into a three-dimensional space having a plurality of regions, wherein the shape of the plurality of regions is selected from a group of tetrahedron, cube, and rhombohedron;
receiving one or more clipping shapes each having one or more connected planes, each plane including a clipping domain indicator on a side thereof to indicate a clipping direction;
generating one or more clipping sections based on the one or more clipping shapes and partitioning the regions into a plurality of sub-regions as a function of intersections between the clipping sections and already partitioned regions and sub-regions of the three-dimensional space, wherein the shape of the plurality of sub-regions are the same as the shape of the plurality of regions, and wherein the plurality of sub-regions are defined by points that include intersection points created by the intersections;
generating, based on the partitioning of the regions, at least one clipped volume domain having an envelope composed of planar faces, the envelope representing a planar boundary of the clipped volume domain;
projecting the envelope of the at least one clipped volume domain on a screen plane according to a first viewpoint;
determining, according to each pixel of the screen plane with respect to the first viewpoint, which faces of the envelope are projected onto each pixel;
rendering, according to the first viewpoint, the three-dimensional modeled object as clipped based on the clipped volume domain and results of the determining.

30. The non-transitory computer-readable medium according to claim 29, further comprising:
partitioning the three-dimensional space into the sub-regions based on the clipping domain indicator to generate the at least one clipped volume domain,
wherein the one or more clipping sections each correspond to a different plane of the clipping shapes.

31. The non-transitory computer-readable medium according to claim 30, wherein the partitioning includes repeatedly dividing the three-dimensional space with each clipping section to create a plurality of tetrahedron-shaped regions as the sub-regions.

32. The non-transitory computer-readable medium according to claim 30, wherein the at least one clipped volume domain includes one or more regions bounded by the one or more clipping sections in a direction indicated by the clipping domain indicator.

33. The non-transitory computer-readable medium according to claim 32, wherein the faces of the envelope are planes of the envelope.

34. The non-transitory computer-readable medium according to claim 32, wherein the faces of the envelope of the at least one clipped volume domain include surfaces of the regions bordering the at least one clipped volume domain.

35. The non-transitory computer-readable medium according to claim 33, wherein the determining comprises:
partitioning the screen plane into a plurality of tiles having respective pixels located therein; and
assigning the one or more faces to the plurality of tiles based on the projection of the envelope with respect to the first viewpoint.

36. The non-transitory computer-readable medium according to claim 35, where the determining further includes storing an equation of each face of each tile on the screen plane.

37. The non-transitory computer-readable medium according to claim 36, wherein the determining further includes
generating a rendering index for each tile, and
linking the rendering index for each tile to respective stored equations of each face of each tile.

38. The non-transitory computer-readable medium according to claim 29, wherein the rendering comprises:
receiving a fragment of the three-dimensional modeled object; and
comparing a location of the fragment on the screen plane to the projected faces of the envelope.

39. The non-transitory computer-readable medium according to claim 37, wherein the rendering comprises:
receiving a fragment of the three-dimensional object;

comparing a location of the fragment to the partitioned screen plane to determine at which tile the fragment is located;

obtaining the stored equation of each face via the rendering index of the tile at which the fragment is located; and comparing the location of the fragment to the equation of each face.

40. The non-transitory computer-readable medium according to claim 39, wherein the rendering further includes rendering fragments outside of the envelope based on results of the comparing.

41. The non-transitory computer-readable medium according to claim 40, wherein each tile is assigned a different color as the rendering index and the equation of each face of each tile is determined by accessing the stored equation of each face based on the color of the tile.

42. The non-transitory computer-readable medium according to claim 40, further comprising:

repeating the generating, projecting, determining and rendering steps when one or more new clipping shapes are received.

43. The non-transitory computer-readable medium according to claim 40, further comprising:

receiving an input to change the first viewpoint; and repeating the projecting, determining and rendering steps and not the generating steps when the first viewpoint is changed.

* * * * *